Patented Feb. 16, 1943

2,311,136

UNITED STATES PATENT OFFICE 2,311,136

LATEX COMPOSITION

Robert R. Sterrett, Naugatuck, Conn., assignor to United States Rubber Company, New York, N. Y., a corporation of New Jersey No Drawing. Application June 11, 1940, Serial No. 339,883

6 Claims. (Cl. 260—740)

This invention relates to latex compositions and more particularly to latex compositions containing milk.

Milk has been added to latex to reduce foaming and to prevent "webbing" in dipping operations, for example, in the manufacture of gloves, as described in patent to Nikitin 1,931,673. As stated in that patent, the addition of milk to latex increases the viscosity of the latex. Not only does the addition of milk to latex thicken the latex when first mixed, but on standing the viscosity of the mixture continues to increase, thereby making uniform dipping operations extremely difficult.

The object of the present invention is to prevent changes in the viscosity of latex and milk compositions on standing and to minimize the thickening effect of the milk on addition to latex.

I have found that the thickening of latex on the addition of milk and the further increase in viscosity subsequent to the addition of milk to latex may be minimized by the addition of alkali oxalates or alkali fluorides without impairing the anti-webbing and anti-foaming properties of the latex-milk compositions.

The term "milk" as used herein is to be construed broadly to mean the milk of mammals and the various milk products produced therefrom, such as cows' sweet milk, skimmed milk, cream, buttermilk, evaporated milk, condensed milk, powdered milk, and the like. The term "latex" as used herein refers to natural dispersions of rubber, which may be of normal or higher concentration and preserved against putrefaction, as by the addition of ammonia or other germicidal agents. The term "alkali" used herein in reference to oxalates and fluorides includes the ammonium as well as the alkali-metal salts of oxalic and hydrofluoric acid, but excludes the alkali-earth metal salts.

The milk may be added to latex in any desired amount since latex and milk are miscible in all proportions. However, for purposes of imparting anti-webbing and anti-foaming properties to latex, 15 parts of milk solids per 100 parts of latex solids are generally sufficient. The amount of alkali oxalate or fluoride added to prevent increase in the viscosity and maintain constant the physical properties of the latex-milk composition is not critical, but more than 15 parts of alkali oxalate or fluoride per 100 parts of milk solids are not necessary. The alkali oxalate or fluoride may be added to the latex before the milk is added, or simultaneously therewith, or shortly thereafter. Preferably, however, the alkali oxalate or fluoride is added to the milk prior to its addition to the latex.

The present invention is illustrated in the following examples:

Example I

Various amounts of milk were added to a centrifuged latex of 61% total solids with and without ammonium oxalate. The viscosities were measured 5 minutes after preparation of the various compositions using a funnel viscosimeter. The milk was added to the latex in the form of a 12% solution of powdered milk and where ammonium oxalate was added, this was dissolved in the milk solution before addition to the latex in an amount equivalent to 5% of the weight of the milk solids. The following are the results of the relative viscosity measurements of the various latex milk compositions, the values being referred to water which is given a viscosity of 1. The 61% centrifuged latex without the milk addition has a relative viscosity of 1.4.

| | Latex (pts. by wt. wet basis) | Milk solution without ammonium oxalate (pts. by wt. wet basis) | Milk solution containing ammonium oxalate (pts. by wt. wet basis) | Relative viscosity |
|---|---|---|---|---|
| 1 | 164 | 12 | | 7.9 |
| 2 | 164 | 24 | | 3.2 |
| 3 | 164 | 48 | | 2.1 |
| 4 | 164 | 96 | | 7.0 |
| 5 | 164 | | 12 | 1.5 |
| 6 | 164 | | 24 | 1.5 |
| 7 | 164 | | 48 | 1.2 |
| 8 | 164 | | 96 | 1.1 |

It may be clearly seen from the above table that the addition of ammonium oxalate prevented the thickening of the latex by the addition of milk, the milk solution containing the ammonium oxalate changing the viscosity of the latex very little from its original viscosity. As larger quantities of the milk solution are added, as in compounds numbered 7 and 8, the viscosity decreases in a manner similar to the case where the latex might be diluted with water. The visible changes in the viscosities of the above compounds was followed over a period of about six weeks. Compounds 1 to 4 which did not contain ammonium oxalate thickened somewhat the first day on standing; then compounds 2, 3 and 4 thickened almost to a gel in two weeks, and subsequently all four compounds were putrefied at the end of six weeks. Compounds 5 to 8 containing ammonium oxalate remained practically the same over the six weeks period.

Similar results are obtained using other alkali oxalates than ammonium oxalate and using alkali fluorides, as shown in the next example.

Example II

In this example 16.7 parts by weight of a 15% aqueous solution of powdered milk were added to 164 parts by weight of a 61% centrifuged latex, in one case without addition of any salt, and in 3 other cases with the addition of 3 parts of a 5% solution of ammonium oxalate, potassium oxalate, and ammonium fluoride, to the milk before mixing with the latex. In all cases water was added to 57% total solids of the latex-milk composition. The viscosities of the above compounds were obtained at the time of mixing and again after 2 hours, after 1 day and after 3 days. The relative viscosities found are shown in the following table:

|  | Relative viscosity | | | |
| --- | --- | --- | --- | --- |
|  | As mixed | After 2 hours | After 1 day | After 3 days |
| Latex plus milk | 5.0 | 3.3 | 2.2 | 1.7 |
| Latex plus milk plus ammonium oxalate | 1.5 | 1.4 | 1.4 | 1.4 |
| Latex plus milk plus potassium oxalate | 1.5 | 1.5 | 1.4 | 1.4 |
| Latex plus milk plus ammonium fluoride | 1.7 | 1.7 | 1.7 | 1.7 |

It may be seen from the above that the addition of alkali oxalate or alkali fluoride to latex and milk compositions prevents increase in the viscosity of the compositions as prepared, and maintains a constant viscosity after preparation, thereby eliminating the objections inherent in an initially high viscosity and in a changing of the physical properties of the latex-milk composition on ageing.

In view of the many changes and modifications that may be made without departing from the principles underlying the invention, reference should be made to the appended claims for an understanding of the scope of the invention.

Having thus described my invention, what I claim and desire to protect by Letters Patent is:

1. A latex composition containing milk and material from the group consisting of ammonium and alkali-metal oxalate.

2. A latex composition containing small amounts of milk and material from the group consisting of ammonium and alkali-metal oxalate, said composition being free from added polyvalent metal ions.

3. A latex composition containing milk, and material from the group consisting of ammonium and alkali-metal oxalate in amount up to 15 parts per 100 parts milk solids.

4. A latex composition containing milk in amount up to 15 parts milk solids per 100 parts latex solids, and containing material from the group consisting of ammonium and alkali-metal oxalate in amount up to 15 parts per 100 parts milk solids.

5. A latex composition containing milk, and material from the group consisting of ammonium and alkali-metal oxalate in amount up to 15 parts per 100 parts milk solids, said composition being free from added polyvalent metal ions.

6. A latex composition containing milk in amount up to 15 parts milk solids per 100 parts latex solids, and containing material from the group consisting of ammonium and alkali-metal oxalate in amount up to 15 parts per 100 parts milk solids, said composition being free from added polyvalent metal ions.

ROBERT R. STERRETT.